United States Patent
Zheng et al.

(10) Patent No.: US 9,538,142 B2
(45) Date of Patent: Jan. 3, 2017

(54) SERVER-SIDE SUPPORT FOR SEAMLESS REWIND AND PLAYBACK OF VIDEO STREAMING

(75) Inventors: Lei Zheng, Saratoga, CA (US); Christopher Dylan Bentzel, Quincy, MA (US); Kyle Kakligian, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 940 days.

(21) Appl. No.: 12/365,722

(22) Filed: Feb. 4, 2009

(65) Prior Publication Data

US 2010/0195974 A1 Aug. 5, 2010

(51) Int. Cl.
  H04N 7/173 (2011.01)
  H04N 5/76 (2006.01)
  H04N 21/231 (2011.01)
  H04N 21/2387 (2011.01)
  H04N 21/658 (2011.01)
  (Continued)

(52) U.S. Cl.
  CPC ........... H04N 7/17318 (2013.01); H04N 5/76 (2013.01); H04N 21/2387 (2013.01); H04N 21/23106 (2013.01); H04N 21/6581 (2013.01); H04N 21/6587 (2013.01); H04N 21/8455 (2013.01)

(58) Field of Classification Search
  CPC  H04N 7/17318; H04N 5/76; H04N 21/23106; H04N 21/2387; H04N 21/6581; H04N 21/6587; H04N 21/8455
  USPC ....................................................... 725/105
  See application file for complete search history.

(56) References Cited

U.S. PATENT DOCUMENTS 6,128,653 A * 10/2000 del Val et al. ................ 709/219
2001/0029525 A1 * 10/2001 Lahr .................. G06F 17/30864
                                                  709/218
2002/0091762 A1    7/2002 Sohn et al.
(Continued)

FOREIGN PATENT DOCUMENTS

CN         1349713 A         5/2002
CN         1909509 A         2/2007
(Continued)

OTHER PUBLICATIONS

PCT International Search Report and Written Opinion, PCT/US2010/023140, Mar. 19, 2010, 12 Pages.
(Continued)

*Primary Examiner* — Nathan Flynn
*Assistant Examiner* — Alfonso Castro
(74) *Attorney, Agent, or Firm* — Fenwick & West LLP

(57) ABSTRACT

A system and method provide server side support for seamless, scalable rewind and playback of a video stream. A video stream is stored and indexed in a network storage place. A video stream can be indexed at frame level where each intra frame of the video stream has an index indicating the file offset and the time stamp of the intra frame in the video stream. A user request for rewinding of a video stream while the video stream is being broadcast is processed by extracting the rewinding time requirement from the user request. The extracted rewinding time value is used to calculate the requested file offset. The video stream starting at the requested time is retrieved and played back according to the user request. The system also provides server side support for seamless rewinding of a video stream and scalable system performance across multiple streaming data centers.

20 Claims, 8 Drawing Sheets

(51) Int. Cl.
*H04N 21/6587* (2011.01)
*H04N 21/845* (2011.01)

(56) References Cited

U.S. PATENT DOCUMENTS

| | | | |
|---|---|---|---|
| 2005/0034164 A1* | 2/2005 | Sano | H04N 7/17318 725/91 |
| 2006/0005224 A1* | 1/2006 | Dunning | H04N 21/218 725/115 |
| 2006/0090186 A1 | 4/2006 | Santangelo et al. | |
| 2007/0036303 A1 | 2/2007 | Lee et al. | |
| 2007/0136487 A1* | 6/2007 | Woo et al. | 709/231 |
| 2007/0168541 A1 | 7/2007 | Gupta et al. | |
| 2008/0063378 A1 | 3/2008 | Togo et al. | |
| 2008/0168516 A1* | 7/2008 | Flick et al. | 725/112 |
| 2008/0235742 A1 | 9/2008 | Osaki et al. | |
| 2009/0083812 A1* | 3/2009 | Tang | H04N 7/17318 725/93 |
| 2009/0106288 A1* | 4/2009 | Yang et al. | 707/101 |
| 2010/0198977 A1* | 8/2010 | Shetty et al. | 709/231 |

FOREIGN PATENT DOCUMENTS

| | | |
|---|---|---|
| CN | 101202900 A | 6/2008 |
| EP | 1286349 A1 | 2/2003 |
| GB | 2447736 A | 9/2008 |
| JP | 11-298858 | 10/1999 |
| JP | 2002199344 A | 7/2002 |
| JP | 2002-330379 | 11/2002 |
| JP | 2003-018568 | 1/2003 |
| JP | 2003-235012 | 8/2003 |
| JP | 2005-051794 | 2/2005 |
| JP | 2008-236321 | 10/2008 |
| JP | 2008-236390 | 10/2008 |

OTHER PUBLICATIONS

Patent Examination Report for Australian Patent Application No. 2010210639, Aug. 5, 2013, 5 pages.
Office Action for Canadian Patent Application No. CA 2,751,404, Jul. 8, 2014, 2 Pages.
Office Action for Canadian Patent Application No. CA 2,751,404, Jun. 8, 2015, 4 Pages.
Board Opinion for Chinese Patent Application No. CN 201080012757.2, Sep. 28, 2015, 14 Pages.
$2^{nd}$ Office Action for Chinese Patent Application No. CN 201080012757.2, Mar. 11, 2014, 16 Pages.
Notice of Grounds for Rejection for Japanese Patent Application No. P2011-548428, Nov. 26, 2013, 6 Pages.
Office Action for Chinese Patent Application No. 201080012757.2, Aug. 9, 2013, 18 Pages.
Official Notice of Preliminary Rejection for Korean Patent Application No. 10-2011-7020525, Oct. 17, 2013, 12 Pages.
Supplementary European Search Report for European Patent Application No. 10739098, Oct. 14, 2013, 11 Pages.
Archive of Schulzrinne, H. et al., "Real Time Streaming Protocol (RTSP)," IETF RFC 2326, ietf.org, Apr. 1998, Published Feb. 4, 2009, 81 pages, [Archived by http://archive.org on Feb. 1, 2009; Retrieved Nov. 19, 2014] Retrieved from the Internet<URL:http://web.archive.org/web/20090201165435/http://ietf.org/rfc/rfc2326.txt>.
Australian Second Office Action, Australian Application No. 2010210639, Oct. 29, 2014, 5 pages.
Chinese Second Office Action, Chinese Application No. 201080012757.2, Mar. 11, 2014, 16 pages.
Board Opinion for Chinese Patent Application No. CN 201080012757.2, Feb. 26, 2016, 18 Pages.
Board Decision by the Patent Reexamination Board for Chinese Patent Application No. CN 201080012757.2, Jul. 28, 2016, 37 Pages.

\* cited by examiner

SERVER-SIDE SUPPORT FOR SEAMLESS REWIND AND PLAYBACK OF VIDEO STREAMING

BACKGROUND OF THE INVENTION

The present invention relates generally to streaming video content over a telecommunications network such as the Internet, and more particularly to a method for providing server side support for seamless rewind and playback of such live video streams.

BACKGROUND

A video streaming system is capable of delivering live video streams to a large number of users through Internet-based broadcasting-like services. Conventional video streaming systems provide the users with a video player running on a client machine. The video player receives and buffers the live video stream in the local memory of the client machine. In response to a user request for rewinding and then playback of a live video stream, the video player accesses the buffered video from the local memory. Such client-side support for rewinding video streams requires a large amount of client side computing resources, such as a fast central processing unit (CPU), adequate memory and disk space, for storing the received video stream from a streaming server, calculating the timing requirement for rewinding while continuing receiving subsequent streaming data packets. As a result, users have to typically suffer processing delay and experience degraded streaming services.

Another problem faced by the existing implementations of client side support for rewinding live video streams is lack of scalability of a video streaming system. A live video stream is commonly broadcasted to thousands, and potentially millions of viewers concurrently. A video streaming system often comprises a large number to sub-systems, each of which may include multiple incoming streaming servers to receive live video/audio feeds, multiple of stream handlers to process the live video streams and multiple of video streaming servers to provide requested video streams to the viewers. Archiving and retrieving across the multiple sub-systems without downgrading user experience calls for a more efficient video stream archiving/retrieving and scalability support at the server side of the video streaming system.

SUMMARY

A method, system and computer program product provides server side support for seamless rewind and playback of video streams.

An embodiment of a video streaming computer system includes a plurality of streaming data center computer systems. A streaming data center computer system comprises an incoming streaming server computer system, one or more stream handlers, a stream archiving database system, a local index database system and one or more streaming server systems. A streaming data center computer system collects via a network connection incoming video/audio streams from various video feeds, and distributes the video streams to the stream handlers for archiving and indexing. The streaming data center also receives streaming requests from user client devices, and provides the requested service to the users.

The streaming archiving database system stores video streams indexing information contributed by the streaming data centers. For each video stream from a streaming data center, in one embodiment, there is a GOP-level index file that stores an index of each GOP of the video stream. In another embodiment, for each video stream, there is a frame-level index file that stores an index of each intra frame of the video stream.

An embodiment of a method includes receiving a streaming request from a client device and identifying a stream handler to serve the request. In response to a rewinding request while the video stream is being broadcast, the method comprises extracting a rewinding time requirement, calculating a file offset corresponding to the rewinding time requirement and streaming the requested video stream. The time requirement is determined from the rewind request, relative to the start of the video broadcast. An offset into the video for the portion of the video corresponding to the time is determined from an index, and the data corresponding to the portion of the video is retrieved and streamed to the client device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

Figure 1:
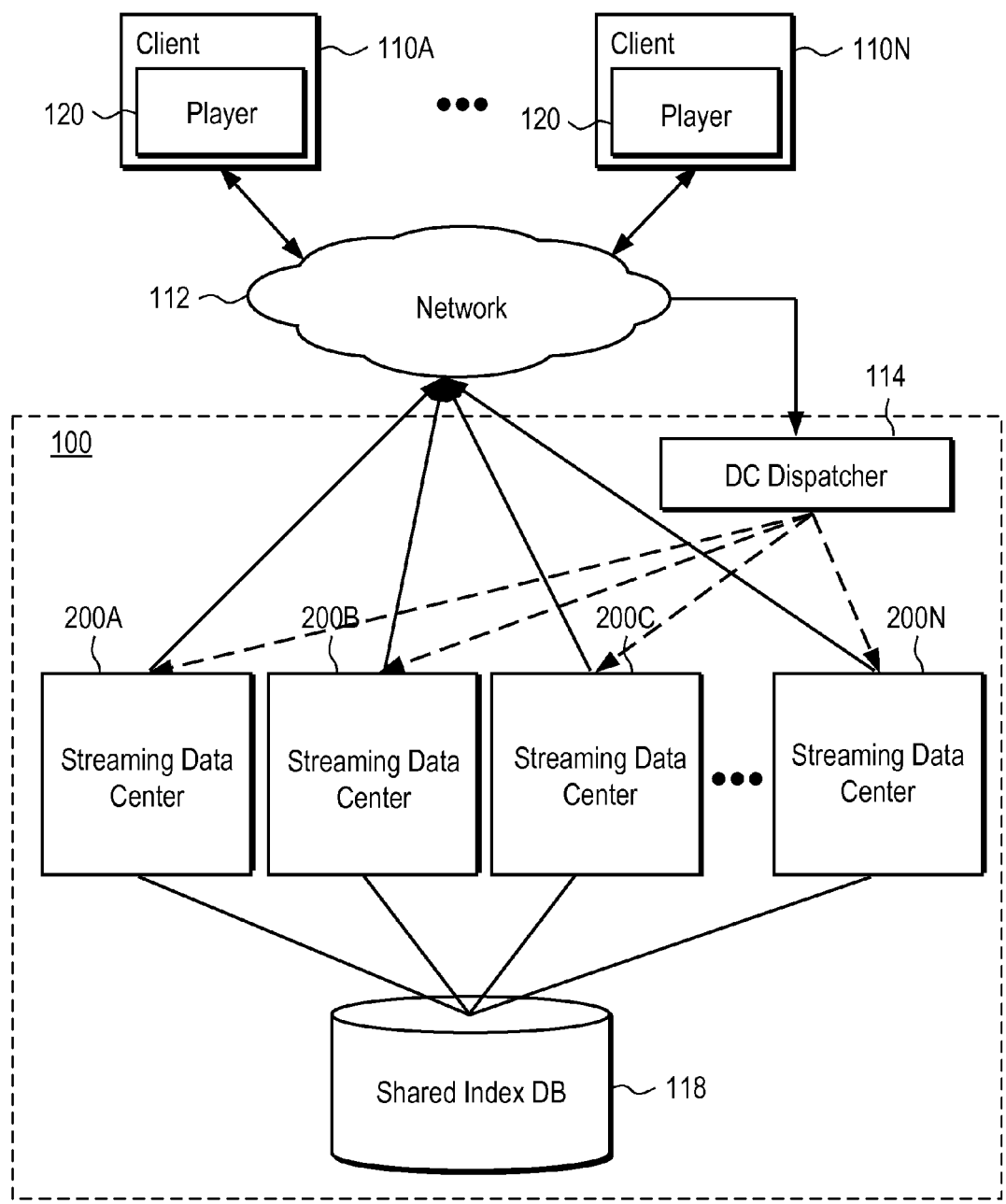
FIG. 1 is a block diagram illustrating an environment having a streaming system for sever-side support for seamless rewind and playback of live video streaming.

FIG. 1 is a block diagram illustrating an environment having a streaming system 100 that receives video streaming requests from clients 110 and sends requested streaming data to clients 110 according to one embodiment. The system 100 includes a data center dispatcher computer system 114 ("data center dispatcher 114"), a shared index database computer system 118 ("shared index database 118"), and one or more streaming data center computer systems 200A-N ("streaming data center 200"). Each of these computer systems comprises one or more computers, preferably server-grade computers having one or more processors, large high performance disk storage arrays (e.g., 1 Tb), and available memory (e.g., 1 Gb). The clients 110 and the streaming data center 200 are interconnected via a computer network 112, such as the Internet. The data center dispatcher 114 communicates with the clients 110 and the streaming data center 200. Each streaming data center 200 handles a plurality of video streams, by writes video stream indexing information to the shared index database 118, retrieving the video stream indexing information from the shared index database 118, and providing each video stream to one or more of the clients 110. Only two clients 110 and four streaming centers 200 are shown in FIG. 1 in order to simplify and clarify the figure, but in practice, include many more clients 110 and streaming data centers 200 can be in operation.

The illustrated environment represents a typical scenario where multiple users/viewers subscribe to video streaming services provided by the streaming data centers 200. In this scenario, a user uses the client 110 to send a video streaming service request to a streaming data center 200 through the data center dispatcher 114 and receives the requested service from the streaming data center 200 directly (i.e., without going through the data center dispatcher 114). The data center dispatcher 114 dispatches the streaming service request to one of the streaming data centers 200 based on some criteria, such as load of each of the streaming data centers. The streaming data center 200 selected by the data center dispatcher 114 receives the streaming service request from the client and provides the requested service to the client 100 via the network 112.

Turning to the individual entities illustrated on FIG. 1, each client 110 is used by a user to request video streaming services. For example, a user uses a client 110 to send a request for subscribing to a broadcasted video stream, playing a video stream, pausing a video stream, or rewinding a video stream to a specified time point while the video is still being broadcast. The client 110 can be any type of computer device, such as a personal computer (e.g., desktop, notebook, laptop) computer, as well as devices such as a mobile telephone, personal digital assistant, IP enabled video player. The client 110 typically includes processor, a display device (or output to a display device), a local storage, such as a hard drive or flash memory device, to which the client 110 stores data used by the user in performing tasks, and a network interface for coupling to the system 100 via the network 112.

A client 110 also has a video player 120 (e.g., the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the present invention. The player 120 includes user interface controls (and corresponding application programming interfaces) for selecting a video feed, starting, stopping, and rewinding a video feed. Also, the player 120 can include in its user interface a timeline slider configured to indicate the progress of the video streaming, for example, the current time of playback relative to the total time of the video stream (if known). The timeline slider would be further configured for direct manipulation in the user interface by which the user can move the timeline slider to specify how much (e.g., in minutes) he/she wants to rewind video stream to view a previously broadcast portion thereof. Other types of user interface controls (e.g., buttons, keyboard controls) can be used as well to control the playback and rewind functionality of the player 120.

The network 112 enables communications between the clients 110 and the streaming data centers 200. In one embodiment, the network 112 is the Internet, and uses standardized internetworking communications technologies and protocols, known now or subsequently developed that enable the clients 110 to communicate with the streaming data centers 200.

For purpose of this description, a video stream is a video stream from a live video feed such as live sports, music, news, and entertainment broadcasted by streaming media content providers over the Internet. The video stream also comprises video streams from recorded feed such as a recorded live concert, TV shows or movies re-broadcasted by streaming media content providers over the Internet. Each video stream is identified by a stream identification (ID). A video stream comprises multiple intra frames (I frames), predictive frames (P frames) and may have bi-directionally predicted frames (B frames), depending on the codec. Multiple video frames of a video stream can be further grouped into groups of pictures (GOP), where each GOP comprises at least one intra frame. A video stream is stored in a network storage as one or more related files, each of which comprises a plurality of audio/video data packets. The feed/source of video (such as TV broadcasting stations, or Internet-based video streams providers) is connected to an encoder. The encoder is responsible for capturing and digitizing the received video stream, compressing it and passing the resulting data to a video server for further processing.

The data center dispatcher 114 is generally used when a user stream request sent from the client 110 requires a domain name server (DNS) lookup. For example, a requested stream from a user is located at "http://host.com/stream_id". The client 110 on behalf of the user communicates with the data dispatcher 114 to find out the Internet Protocol (IP) address of the host server "host.com" that is hosting the stream "stream_id". The data center dispatcher 114 dispatches the streaming service request to one of the streaming data centers 200 based on some criteria, such as load of each of the streaming data centers. The load of each of the streaming data centers can be calculated based on the bandwidth usage per data center and a bandwidth capacity value assigned to each streaming data center. The data center dispatcher 114 balances the load by avoiding sending streaming requests to a streaming data center whose bandwidth usage is close to its full capacity. Other load balancing mechanisms are readily available to those of ordinary skills in the art.

The shared index database 118 stores video streams indexing information contributed by the streaming data centers 200 for rewinding broadcast video streams. For each video stream from a streaming data center 200, in one embodiment, there is a GOP-level index file that stores an index of each GOP of the video stream. Specifically, the GOP-level index file keeps an index of the first intra frame of each GOP in a tuple (stream_ID, file_offset, time_stamp).

In another embodiment, for each video stream, there is a frame-level index file that stores an index of each intra frame of the video stream. The index stores for each intra frame the tuple (stream_ID, file_offset, time_stamp). "Stream_ID" identifies the video stream to which the intra frame belongs. "file offset" indicates where, in terms of bytes of the video stream file, the intra frame starts. The "file_offset" value is an absolute numerical value counting from the start of the archived file (i.e., byte 0). "time stamp" indicates when the intra frame starts in the archived file of the video stream. The "time_stamp" value is an absolute numerical value counting from the video stream start playing time (i.e., 0 millisecond).

In one embodiment, the indexing information is stored as a global video streams indexing file. The global video streams index file comprises the indices for each video stream processed by the streaming data centers 200. The indices from a particular streaming data center 200 can be further identified by a streaming data center identification. The indexing information is shared by the streaming data centers 200 for serving user streaming requests among multiple streaming data centers 200 with scalability. The embodiments of streaming data center 200 and shared video streams indexing database 118 are further described below with respect to FIGS. 3 and 4.

Figure 2A:
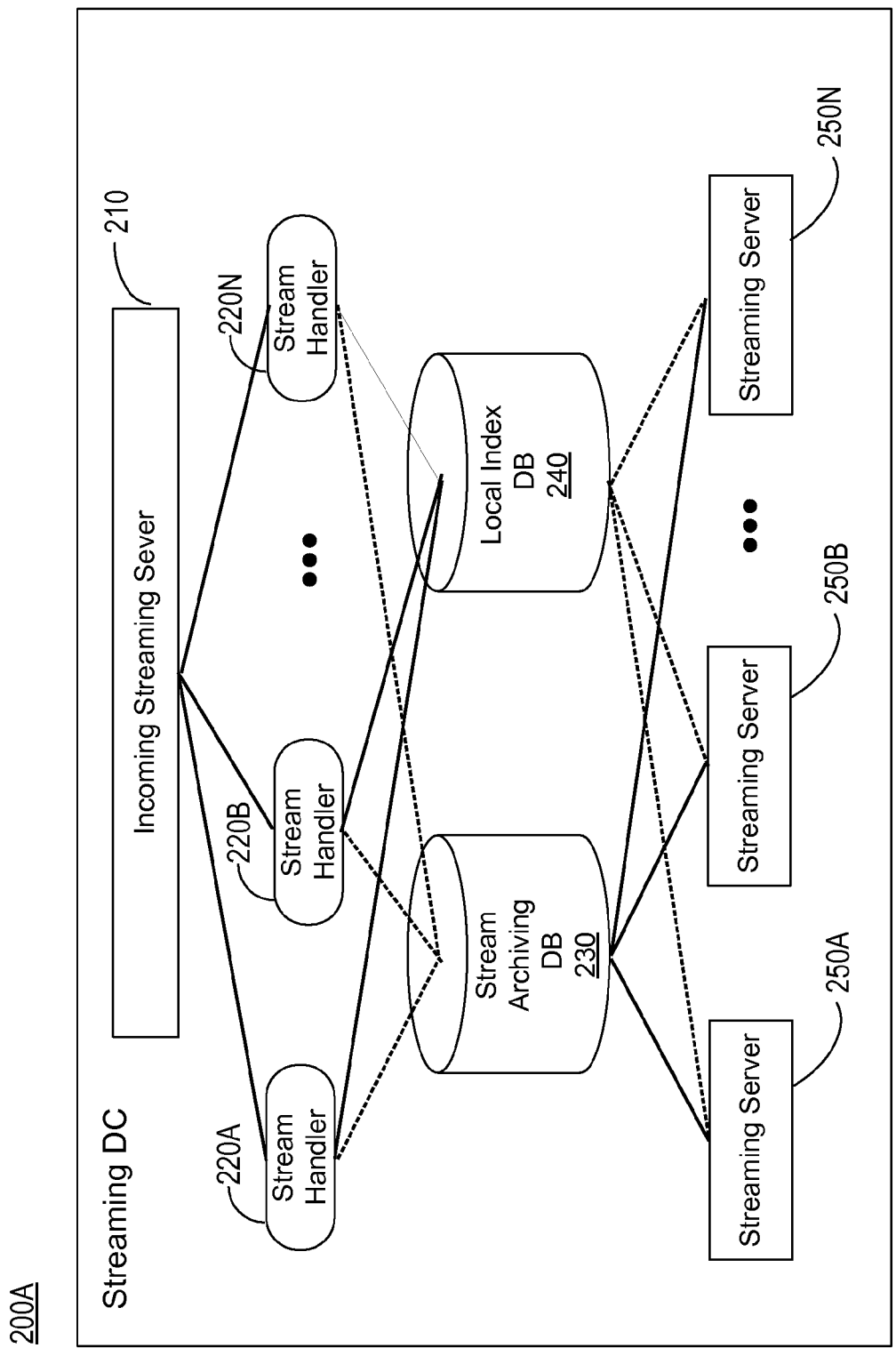
FIG. 2A is a block diagram showing a streaming data center for seamless rewind and playback of live video streaming.

FIG. 2A is a block diagram showing a streaming data center 200 for server side support for seamless rewind and playback of video streaming according to one embodiment. The streaming data center 200 comprises an incoming streaming server 210, one or more stream handlers 220, a stream archiving database 230, a local index database 240 which is a local copy of the shared database 118 in FIG. 1, and one or more streaming servers 250.

As illustrated in FIG. 2A, an incoming server 210 has a plurality of stream handlers 220 coupled to it; each stream handler 220 has a stream handler ID. For each incoming video stream, the incoming server 210 selects one of the stream handlers 220, and directs all the data packets for this incoming video stream to the selected stream handler 220.

The streaming data center 200 also includes a plurality of streaming servers 250 to handle streaming requests from clients. A streaming server 250 handles two types of streaming requests: a request for subscribing to a broadcast video stream and a request for rewinding a broadcast stream. A streaming request for subscribing (subscribe request) to a broadcast video stream does not include timing information for rewinding. A streaming request for rewinding a broadcast stream (rewind request) includes timing information regarding the desired amount/offset for rewinding the video stream while the video stream is being broadcast. Thus, the streaming server 250 differentiates between the requests by whether or not timing information is present in the requests; no other formal semantics are required.

In response to a rewind request, the streaming server 250 finds a file offset corresponding to the timing information in the request by checking the local index database 240, and reads the data packets of the requested video stream starting from the file offset of the video stream stored in the streaming archive database 230.

For example, the player 120 of a client 110 provides its user a timeline view of a video stream being broadcasted. The user can select a location in the timeline slider with a mouse. The player 120 maps the selected location on the timeline slider to a corresponding timing information. For example, assume a live broadcast video is 2-hour in length, and the user selects a location on the timeline slider that is at the halfway point between the beginning and end, then this location is mapped to 1:00. This timing information is included in the video streaming request and sent to the streaming server for processing.

An exemplary rewind request is in form of a URL, such as http://www.hostserver.com/play?id=StreamID&time=timestamp, where streamID is the stream ID of the requested stream and timestamp is a numeric value representing the time value of a starting time relative to the start of the video stream. For example, the user may issue a request for a video stream with a URL like "http://www.hostserver.com/1play?id=Stream12&time=600," which requests a video stream identified by its stream ID "Stream12" and rewinding the video stream to the 600th second (i.e., end of the 10th minute). The timing information (e.g., timestamp value) indicates user rewinding requests regardless the video stream is from a live video feed (e.g., live broadcasting) or from a recorded video source (e.g., re-broadcasting of a recorded live event). In one embodiment, fast-forwarding requests are not supported.

To further illustrate the streaming requests and responses described above, the following pseudo-code represents a data structure used by the streaming server 250 storing the data for a streaming request/response:

```
//video streaming request example//
Message LiveAchieveRequest {
    required message<StreamID> stream;
    required int64 start_time;   //relative time value
}
//video streaming response example//
Message LiveAchieveResponse {
    enum Status {
    OK = 0;
    ERROR_STREAM_NOT_EXIST = 1;
    ERROR_INVALID_TIME = 2;
    }
    required Status status = 1;
    byte_offset: 9000;    //Starts part-way into the stream file
    data_source <filepath: /home/storage/HD/archive_1234>;
}
```

Figure 2B:
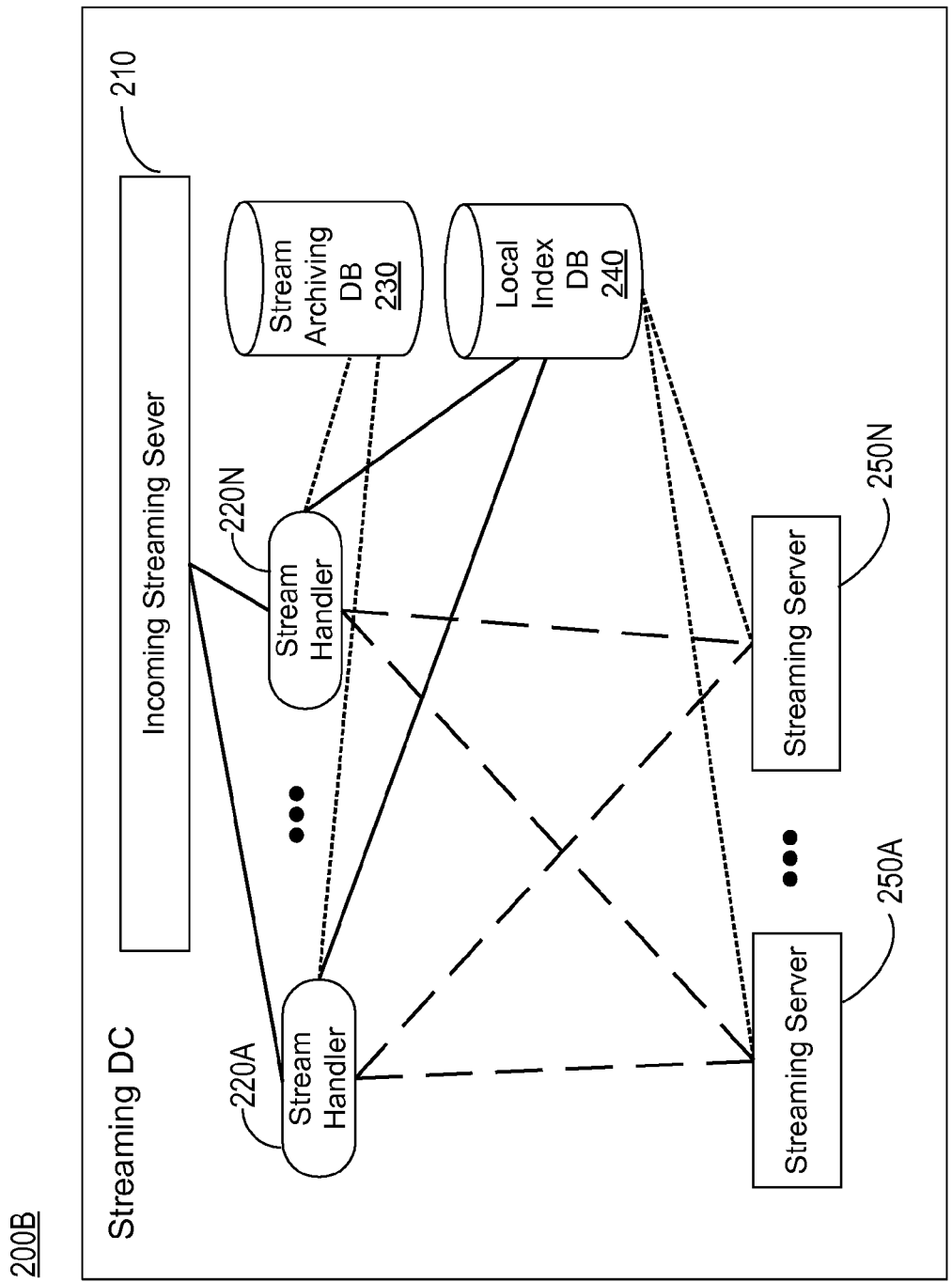
FIG. 2B is a block diagram showing a streaming data center for handling streaming requests for subscribing to a video stream.

A subscribe request for subscribing to a broadcast video stream does not include timing information. Each streaming server 250 can communicate directly with a plurality of stream handlers 220. A streaming request from a client includes a stream ID. Given the stream ID, a streaming server 250 finds which stream handler 220 is responsible for the requested video stream by checking the local index database 240 for the stream ID, subscribes to the identified stream handler 220, and requests data packets of the requested video stream starting from the start of the video stream. FIG. 2B is block diagram showing a streaming data center for streaming requested videos directly from stream handlers according to the description above.

Figure 3:
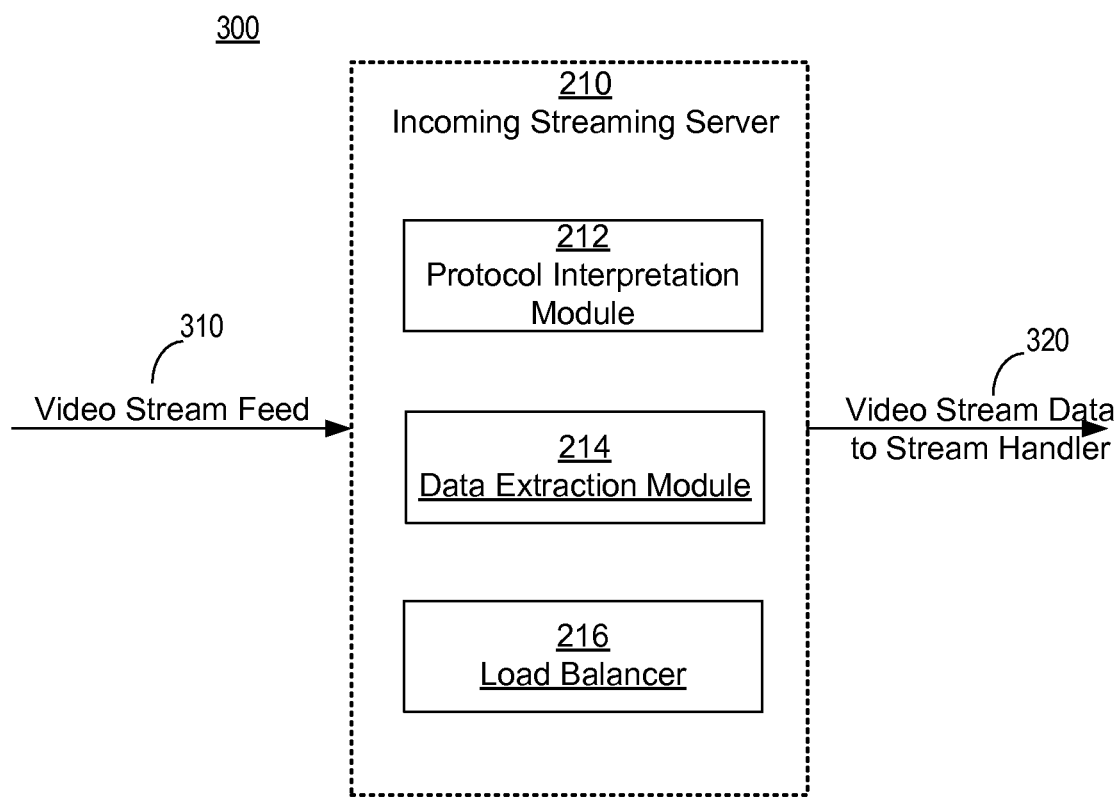
FIG. 3 is a block diagram of an incoming streaming server.

Turning now to FIG. 3, in one embodiment, the incoming streaming server 210 of a streaming data center 200 comprises a protocol interpretation module 212, a data extraction module 214 and a load balancer 216. The incoming streaming server 210 receives a video streams from a video stream feed 310, processes the video stream by the modules 212, 214 and 216, and sends the processed video stream data 320 to a selected stream handler 220 for further indexing and achieving. The incoming streaming server 210 may be a streaming server, e.g., WOWZA® Media Server or Adobe® Flash Media Server. The incoming streaming server 210 may accept video streams using standard video streaming protocols, such as Real Time Streaming Protocol (RTSP), or proprietary protocols, such as Real Time Messaging Protocol (RTMP) developed by Adobe Systems® for streaming audio/video data over the Internet between a Flash player and a streaming server.

The protocol interpretation module 212 processes the received video stream from the video stream feed 310 by identifying the streaming protocol(s) used in the video stream. For example, the incoming streaming server 210 is a streaming server that accepts video streams using RTMP protocol and allows flash players to play video streams in RTMP protocol. The protocols interpretation module 212 identifies the RTMP streaming protocol in the received video stream, and sends the protocol information as part of the video stream information to one or more of the stream handlers 220.

The data extraction module 214 extracts audio/video data from the received video stream, forms the extracted audio/video data into audio/video data packets, and sends the extracted audio/video data packets to one or more of the stream handlers 220. In one embodiment, the audio/video packets are standard network data packets to be transmitted to the stream handlers 220 using User Datagram Protocol (UDP). Other embodiments may extract the received video stream into network packets using other Internet protocols.

The load balancer 216 determines, for an incoming video stream, which one of the stream handlers 220 receives the video stream for achieving and indexing using a load balancing algorithm. In one embodiment, the load balancer 216 selects a stream handler 220 among the plurality of stream handlers 220 for the video stream based on the traffic load of each stream handler 220. The load balancer 216 may choose the stream handler 200 with the lightest traffic load to process the received video stream. Other embodiments may allow the load balancer to include other determining factors, such as the number of distinct streams, processor utilization, or measures of a rate of packet handling, to select the stream handler 220 for processing the received video stream.

Figure 4:
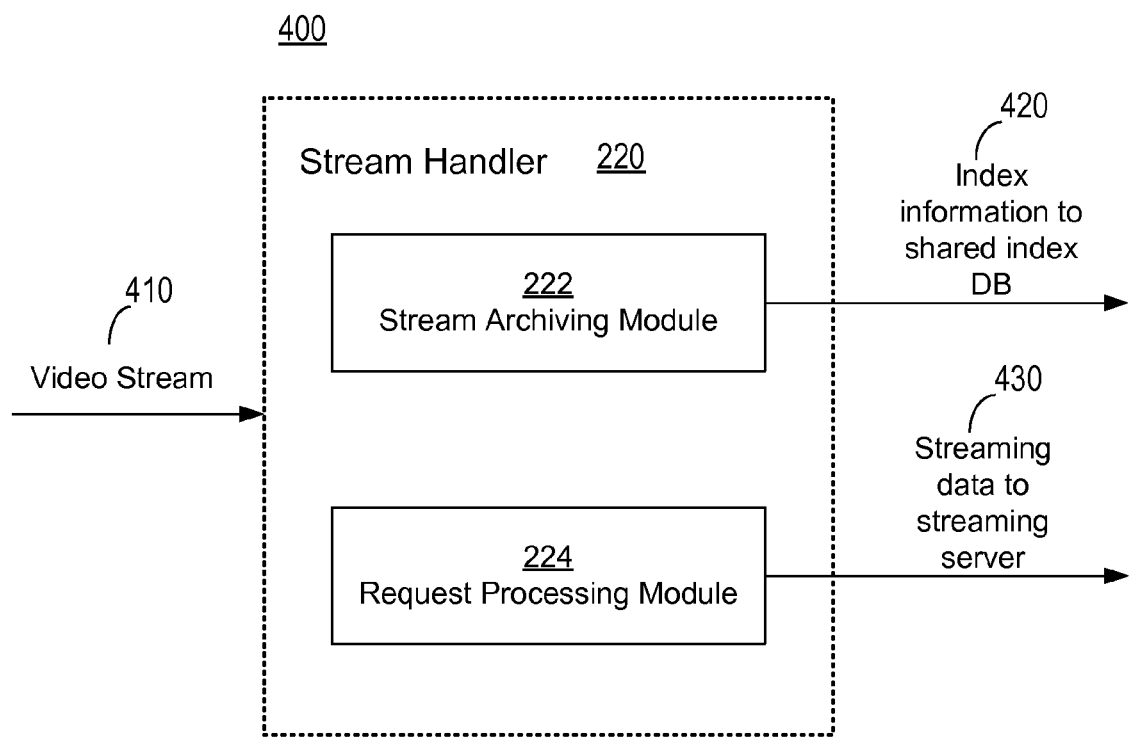
FIG. 4 is a block diagram of a stream handler for seamless rewind and playback of live video streaming.

A stream handler 220 receives a plurality of audio/video data packets of a video stream sent from the incoming streaming server 210 for further processing. FIG. 4 is a block diagram of a stream handler 220 shown in FIG. 2A. The stream handler 220 comprises a stream archiving module 222 and a request processing module 224. The stream archiving module 222 writes stream indexing information 420 to the shared index database 118, and archives/stores the received audio/video data packets in the stream archiving database 230. For rewinding requests, the request processing module 224 retrieves the file offset information from the local index database 240 based on timing information in a rewinding request, and sends the file offset information to the streaming server 250. For streaming requests for subscribing to a video stream, the processing module 224 sends the data packets of the requested video stream received from the incoming streaming server 210 directly to the streaming server 250.

The stream archiving module 222 receives the plurality of audio/video data packets of a video stream and/or video stream information (e.g., video streaming protocols) and stores the data packets in stream archiving database 230. In one embodiment, an entire video stream is stored as one archived file in the stream archiving database 230. The archived video stream can be retrieved from the stream archiving database 230 via the stream ID. All the data packets belonging to a given video stream share the same stream ID for archiving and retrieving purposes.

The streaming archiving module 222 writes the indexing information of the archived file to the shared index database 118. To index the archived video stream, in one embodiment, the archiving module 222 stores an index of each intra frame of the video stream in an index file. The index stores for each intra frame the tuple (stream_ID, file_offset, time_stamp). For example, for an intra frame located at byte 123 and starts to play at 21,000 milliseconds, the index of the intra frame is (stream12, 123, 21000) in the index file. Similarly, for another intra frame of the same video stream that located at byte 345 and starts to play at 24,000 milliseconds, the index is (stream12, 345, 24000). The index file of the entire video stream is a list of indices, each of which corresponds to an intra frame of the video stream. The indices are ordered according to the processing order of the intra frames of the video stream.

To speed up indexing information writes to the shared index database 118, in another embodiment, the stream archiving module 222 keeps an index of each GOP of the video stream in an index file. Specifically, the stream archiving module 22 keeps an index of the first intra frame of each GOP in a format of (stream_ID, file_offset, time_stamp). For example, for a video stream having 5 GOPs, and each GOP being represented by its first intra frame, the index file of the video stream is illustrated in the following table:

TABLE I

| GOP-Level Indexing | | | |
|---|---|---|---|
| GOP | $1^{st}$ Intra Frame | Stream ID | Indexing (stream_id, file_offset, timestamp) |
| 1 | $I_{11}$ | S12 | (S12, 123, 21000) |
| 2 | $I_{21}$ | S12 | (S12, 345, 48000) |
| 3 | $I_{31}$ | S12 | (S12, 456, 96000) |
| 4 | $I_{41}$ | S12 | (S12, 789, 130000) |
| 5 | $I_{51}$ | S12 | (S12, 1200, 256000) |

It is possible that a video stream generates multiple related files to be stored in the archiving database and each related file corresponds to a part of the video stream, in which event the multiple related files will share the same stream ID. To relate the multiple files generated for a video stream, each file may be further tagged by a time stamp which indicates the time offset of this part of the video stream, counting continuously from the start of the first data packet of the video stream (e.g., 10 minutes in the video stream).

To support rewinding of a video stream to a user specified time point while the video stream is being broadcast, the indexing of a video stream needs to be efficient for archiving and retrieving. The stream archiving module 222 keeps the indexing information for each video stream for data retrieving. In one embodiment, the streaming archiving module 222 includes the indexing information for a video stream in a header of the stored video file. This allows the streaming archiving module 222 to first access the stored file based on the stream ID and then read from this header to access the desired offset into the file for the corresponding time point requested by a user.

In another embodiment, the archiving module 222 writes the indexing information for each video stream stored in the archiving database 230 to a global storage (e.g., the shared index database 118 of FIG. 1) shared by multiple streaming data centers 200. The shared index database 118 identifies each indexing information from a particular streaming data center by a streaming center identification. The frame level indexing information for a video stream processed by a streaming center is a list of indices for each intra frame of the video stream. An index can have a tuple (DC_ID, stream_ID, file_offset, time_stamp), where "DC_ID" identifies the streaming data center. The indexing information in the shared index database 118 is updated periodically or on demand in response to new indexing information received for a streaming data center 200. Each streaming data center 200 stores a duplicate of the indexing information stored in the shared index database 118 so that each streaming data center has the knowledge of what video streams archived in other streaming data centers.

Sharing indexing information provides a variety of benefits for scalable video streaming across multiple streaming data centers 200. Sharing indexing information allows the streaming system to distribute video streams efficiently based on multiple factors. For example, the streaming system can designate a particular streaming data center 200 to handle unpopular (i.e., low number of client requests) video streams and archive unpopular video streams only in the designated streaming center 200. By doing so, the other streaming data centers can devote their computing resources to process videos streams in higher demand, while having the necessary information of where to fetch the unpopular video streams in response to a user request. The popularity determination of a video stream is a design parameter. For example, the popularity of a video stream may be determined based on the number of user subscriptions.

Sharing indexing information by multiple streaming data centers 200 also provides improved performance of streaming data centers 200. A streaming data center 200 has the flexibility of which video streams to archive and which video streams are available in the other streaming data centers. When a streaming data center 200 (a servicing streaming data center) receives a rewind request from a client for a video stream that is not locally archived, the servicing streaming data center determines from its local copy of the shared indexing information which other streaming data center (a source streaming data center) is handling the requested video stream. Instead of streaming the requested stream from the source streaming data center to the servicing streaming center then to the client, the servicing streaming data center caches the video stream locally and send the video stream to the client from the local cache. Thus, multiple cross-streaming between data centers is reduced, resulting in overall improved performance.

Referring to FIG. 4, the request processing module 224 receives a streaming request from the video streaming server 250, processes the streaming request and retrieves the requested video stream and sends the requested video stream to the video streaming server.

As described above regarding the streaming server 250 of FIG. 2B, the subscribe requests do not have timing information, which indicates to the streaming server 250 that the client is requesting an initial subscription of a video stream. The streaming server 250 checks the local index database 240 to identify which stream handler 220 is to process the request and passes the request to the identified stream handler 220. The request processing module 224 of the identified stream handler starts sending the data packets of the requested stream received from the incoming streaming server 210 continuously to the streaming server 250.

In response to the rewind request, the streaming server 250 determines whether rewinding is needed. In one embodiment, the streaming server 250 extracts the timing information from the request and checks the value of the requested starting time in the request. The streaming server 250 sends the requested starting time and stream ID to the processing module 224 for further processing. Accordingly, the processing module 224 calculates the file offset based on the extracted timing information. In one embodiment, the processing module 224 maps the relative starting time to its corresponding file offset by checking the local index file to find the time_stamp value closest to the relative starting time. Alternatively, the streaming server 250 may also convert the relative starting time value from the request to an absolute starting time value relative to the current clock time, in which case the processing module 224 maps the absolute starting time value to its corresponding file offset. Here, the streaming server 250 calculates the absolute time value by subtracting the relative starting time from the current clock time used by the streaming server 250. The processing module 224 checks the local index file to find the time_stamp value based on the calculated absolute time value. The streaming server 250 retrieves the intra frame at the file offset closest to the time_stamp and sends the data packets of the intra frame to the client 120.

For example, the request processing module 224 of a stream handler 220 receives a streaming request in a URL as "http://www.hostserver.com/play?id=Stream12&time=600000" from a video streaming server 250. The request contains a relative starting time information, i.e., "time=600000". The requested starting time is a relative starting timing value of 600,000 milliseconds (i.e., 10 minutes from the start of the video stream). The processing module 224 checks the local index database 240 and finds an index record with a closest matching time value, for example (Stream12, 900, 600000).). The "900" value here indicate the byte offset for the intra frame corresponding to the time value of 600,000 milliseconds relative to the start of the video stream. Alternatively, the streaming server 250 converts the relative starting time value 6000,000 to an absolute time value relative to the current clock time. Assume that the video stream was broadcasted 1,800,000 milliseconds ago (i.e., 30 minutes), then the streaming server 250 determines that the absolute time to which to rewind from the current clock time is 1,200,000 milliseconds (20 minutes). The processing module 224 checks the local index database 240 and finds an index record with a closest matching time value, for example (Stream12, 900, 600000). The streaming server 250 retrieves data packets of the intra frame beginning at the file offset 900 of the archived stream and starts sending the data packets from that file offset to the client 120.

In another embodiment, the client 110 converts the timing information in a user request to an absolute time_stamp and sends the time_stamp to the streaming server 250 along with a stream identification. The processing module 224 checks the local index file to find the time_stamp value closest to the received absolute time_stamp value. The processing module 224 retrieves the intra frame at the file offset closest to the time_stamp and sends the data packets of the intra frame.

Figure 5:
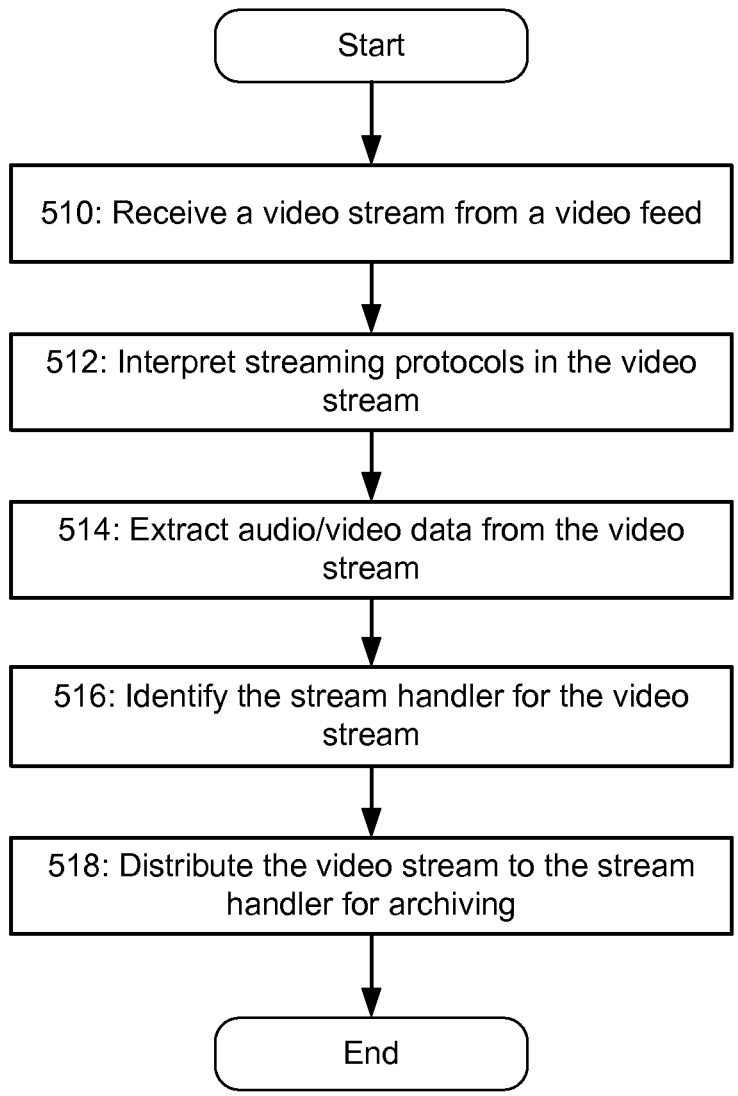
FIG. 5 is a flow chart of processing a video stream by a streaming data center.

FIG. 5 is a flow chart of the operation of a streaming data center 200 to processing a live stream. Initially, the incoming streaming server 210 of the streaming data center 200 receives 510 a video stream from a live feed. The incoming streaming server 210 interprets 512 the streaming protocols in the video stream by the protocol interpretation module 212, and extracts 514 audio/video data from the video stream by the data extraction module 214. The incoming streaming server 210 further identifies 516 the stream handler 220 to further process the video stream and distributes 518 the extracted stream data to the stream handler 220 for archiving and indexing.

Figure 6:
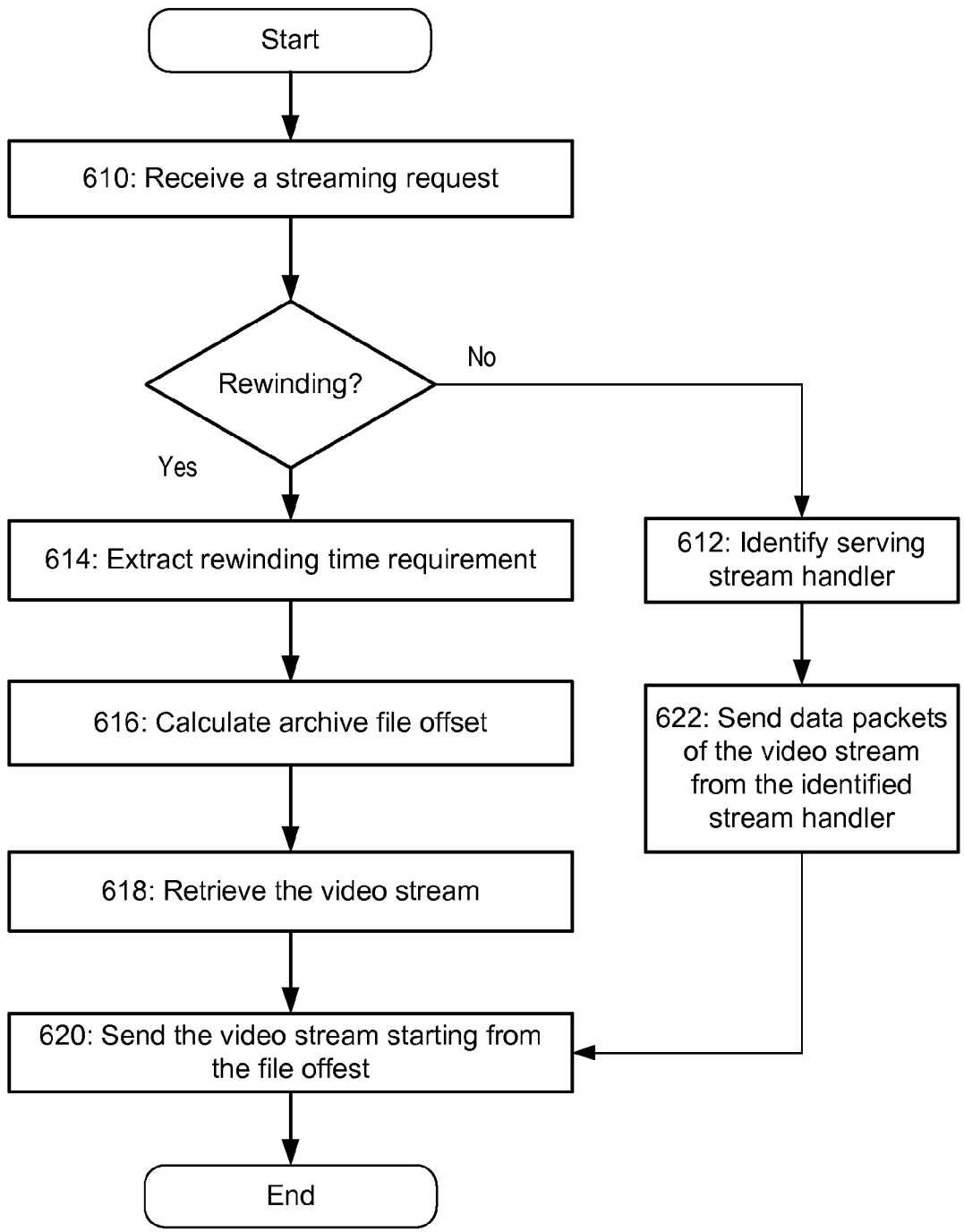
FIG. 6 is a flow chart of serving a streaming request by a streaming data center.

FIG. 6 is a flow chart of the operations of the streaming data center serving to service streaming request from a client device. Initially, one of the streaming servers 250 of the streaming data center 200 receives 610 a streaming request from a user's client device. The streaming request comprises at least a stream ID identifying the video stream requested by the user. In response to the request not containing timing information, the streaming server 250 identifies 612 which stream handler 220 has the requested video stream by checking the stream ID against the local index database 240 and retrieves the data packets of the requested stream starting from the current time. In response to the request containing timing information, the stream handler 220 determines whether the request is for rewinding the video stream. If the request is a rewind request, the streaming server 250 extracts 614 timing information from the request, and the processing module 224 calculates 616 the file offset corresponding to the timing information. The streaming server 250 retrieves 618 the requested stream and sends 620 the video stream starting from the obtained file offset to the client 120.

Figure 7:
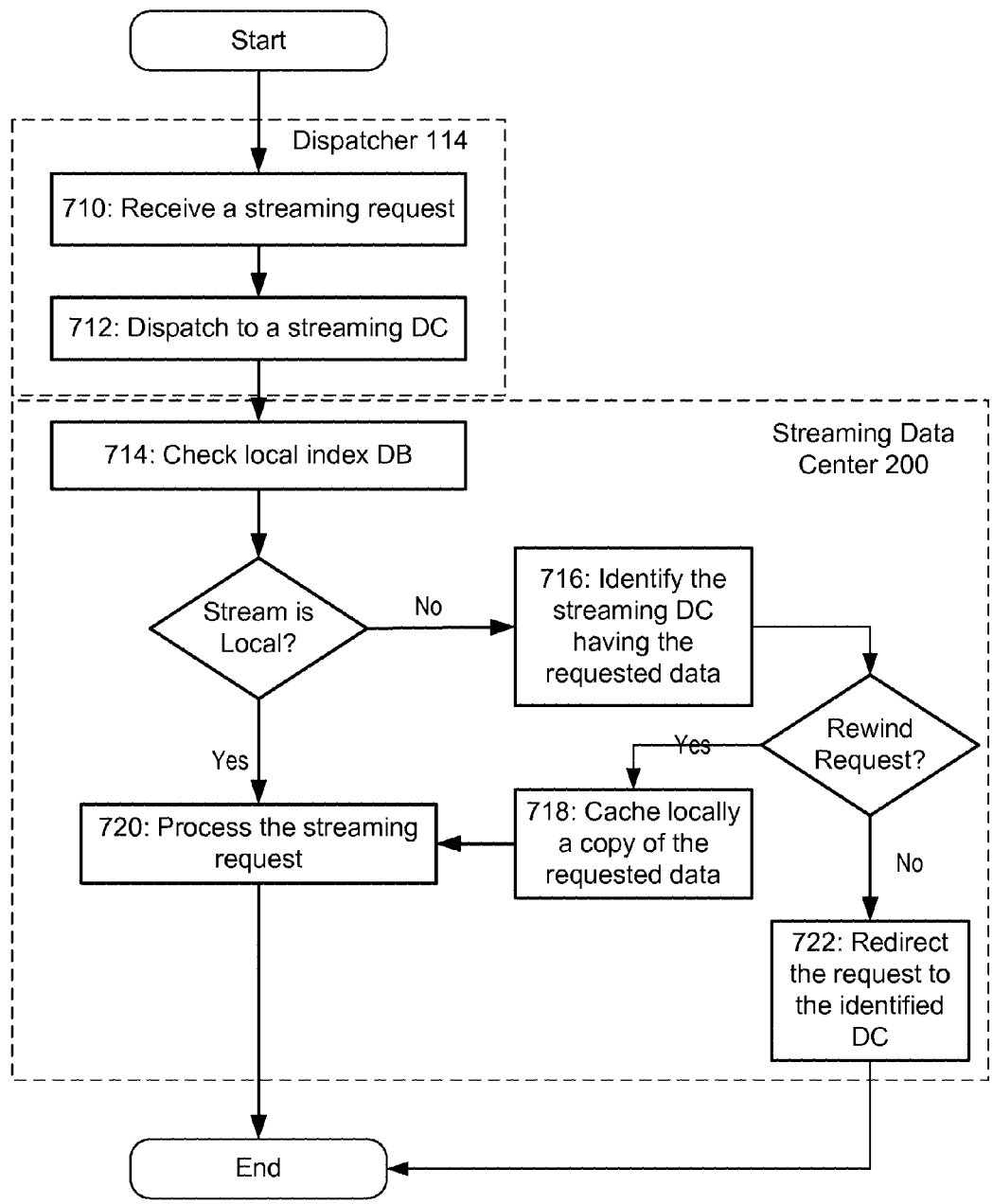
FIG. 7 is a flow chart of serving video streaming requests across multiple streaming data centers with enhanced scalability.

A typical implementation of distributed video streaming system will include multiple streaming data centers as described in FIG. 1. Server side support for seamless rewinding of a video stream while the stream is being broadcast and scalable system performance across multiple streaming data centers 200 is further illustrated in FIG. 6. FIG. 7 is a flow chart of the operations for serving video streaming requests across multiple streaming data centers 200, thus providing enhanced scalability. Initially, the data center dispatcher 114 receives 710 a streaming request from a client. The dispatcher 114 dispatches 712 the request to one of the streaming data centers 200 based on one or more determining factors, such as traffic load of the available streaming data centers 200. The selected streaming data center 200 checks the local index database based on the stream ID of the request. In response to the requested data being available in the local archive database 230 of the selected data center 230, the streaming data center 200 processes 720 the streaming request as described in conjunction with FIG. 2-4 description. In response to the requested data not being available locally, the streaming data center 200 checks the local index database 240 which contains a duplicate of a global indexing file shared by all streaming data centers. Based on the global indexing file, the streaming data center 200 identifies 716 which the other streaming data center 200 has the requested stream. Where the streaming request is a rewind request the streaming data center 200 obtains a copy of the requested stream and stores in a local cache 718. The streaming data center 200 continues to process 720 the streaming request. The processing of the streaming request comprises the processing steps described in FIG. 6, such as identifying 612 the stream handler, extracting 614 rewinding time requirement, calculating 616 archive file offset and streaming 618 the requested video stream. Where the streaming request is a subscribe request, the streaming data center 200 redirects the request to the identified streaming data center. The identified streaming data center checks its local index database 204 to find which stream handler 220 to handle the data packets of the requested stream and sends the data packets of the requested stream from the identified stream handler 220.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for providing rewinding of a broadcast video stream received by a client, the method comprising:
    receiving, by a data center dispatch server, from the client a request for the broadcast video stream;
    selecting, by the data center dispatch server, one of a plurality of streaming data centers to service the request based on a plurality of distribution criteria, the plurality of the distribution criteria including popularity of the requested video stream determined based on a number of users subscribing to the requested video stream exceeding a threshold value, the selected streaming data center having local indexing information of video streams stored at a local storage system of the selected streaming data center and a copy of global indexing information shared by the plurality of streaming data centers;
    determining, by the selected streaming data center, that the request is for rewinding the requested video stream, the request including a stream identification of the requested video stream and timing information indicating a portion of the requested video stream to rewind;
    responsive to the selected streaming data center having the requested video stream stored at the local storage system of the selected streaming data center based on the local indexing information stored at the selected streaming data center, retrieving, by the selected streaming data center, the requested video stream from the local storage system of the selected streaming data center;
    responsive to the selected streaming data center not having the requested video stream stored at the local storage system of the selected streaming data center:
        determining, by the selected streaming data center, which streaming data center of the plurality of streaming data centers has the requested video stream based on the copy of global indexing information stored at the selected streaming data center; and
        obtaining, by the selected streaming data center, the requested video stream from the determined streaming data center and storing the requested video stream in the local storage system of the selected streaming data center different from the determined streaming data center;
    determining, by the selected streaming data center, a file offset into the requested video stream corresponding to the timing information in the request, the file offset being determined from an index file that associates file offsets in the requested video stream with time information for the requested video stream, the index file being stored in the local storage system of the selected streaming data center;
    streaming, by the selected streaming data center, to the client the requested video stream starting from the determined file offset; and
    updating, by the selected streaming data center, the global indexing information shared by the plurality of streaming data centers.

2. The method of claim 1, further comprising receiving, by the selected streaming data center, a video stream from a video source.

3. The method of claim 2, wherein the video source is a live feed.

4. The method of claim 2, wherein the video stream is a recorded video stream.

5. The method of claim 1, further comprising archiving the requested video stream in a network storage system, wherein the archived video stream is identified by the stream identification.

6. The method of claim 5, wherein archiving the requested video stream further comprises storing an index for each intra frame of the requested video stream, wherein the index includes the stream identification, a file offset indicating where the intra frame is located in the requested video stream, and a time stamp indicating when the intra frame starts playing in the requested video stream.

7. The method of claim 6, wherein archiving the requested video stream further comprises storing an index for each first intra frame of a group of pictures of the requested video stream, wherein the index includes the stream identification, a file offset and a time stamp.

8. The method of claim 1, wherein determining the file offset corresponding to the timing information in the request further comprises selecting an index which has a time stamp closest to a time value in the timing information.

9. The method of claim 8, wherein streaming the requested video stream further comprises retrieving an intra frame whose file offset corresponds to the file offset of the selected index.

10. The method of claim 1, further comprising:
    selecting, by the data center dispatch server, a streaming data center from the plurality of the streaming data centers to store a plurality of unpopular video streams, each of the unpopular video streams having a number of subscribers below the threshold value.

11. A computer system for providing rewinding of a broadcast video stream received by a client, comprising:
    a data center dispatch server including a processor; and
    a plurality of streaming data centers, each of the plurality of streaming data centers including a corresponding processor and a local storage system,
    wherein the processor of the data center dispatch server is configured to:
        receive from the client a request for the broadcast video stream, and
        select one of the plurality of streaming data centers to service the request based on a plurality of distribution criteria, the plurality of the distribution criteria including popularity of the requested video stream determined based on a number of users subscribing to the requested video stream exceeding a threshold value, the selected streaming data center having local indexing information of video streams stored at the local storage system of the selected streaming data center and a copy of global indexing information shared by the plurality of streaming data centers, wherein a processor of the selected streaming data center is configured to:
  determine that the request is for rewinding the requested video stream, the request including a stream identification of the requested video stream and timing information indicating a portion of the requested video stream to rewind,
  responsive to the selected streaming data center having the requested video stream stored at the local storage system of the selected streaming data center based on the local indexing information stored at the selected streaming data center,
    retrieve the requested video stream from the local storage system of the selected streaming data center,
  responsive to the selected streaming data center not having the requested video stream stored at the local storage system of the selected streaming data center:
    determine which streaming data center of the plurality of streaming data centers has the requested video stream based on the copy of global indexing information stored at the selected streaming data center, and
    obtain the requested video stream from the determined streaming data center and store the requested video stream in the local storage system of the selected streaming data center different from the determined streaming data center,
  determine a file offset into the requested video stream corresponding to the timing information in the request, the file offset into the requested video stream being determined from an index file that associates file offsets in the requested video stream with time information for the requested video stream, the index file being stored in the local storage system of the selected streaming data center,
  stream the requested video stream to the client starting from the determined file offset, and
  update the global indexing information shared by the plurality of streaming data centers.

12. The system of claim 11, wherein the selected streaming data center includes an incoming streaming server configured to receive a video stream from a video source.

13. The system of claim 12, wherein the video source is a live feed.

14. The system of claim 12, wherein the video stream is a recorded video stream.

15. The system of claim 11, wherein the processor of the selected streaming data center is further configured to archive the requested video stream in a network storage system, wherein the archived video stream is identified by the stream identification.

16. The system of claim 15, wherein the processor of the selected streaming data center is further configured to archive an index for each intra frame of the requested video stream, wherein the index includes the stream identification, a file offset indicating where the intra frame is located in the requested video stream, and a time stamp indicating when the intra frame starts playing in the requested video stream.

17. The system of claim 16, wherein the processor of the selected streaming data center is further configured to store an index for each first intra frame of a group of pictures of the requested video stream, wherein the index includes the stream identification, a file offset and a time stamp.

18. The system of claim 11, wherein the processor of the selected streaming data center is further configured to select an index which has a time stamp closest to a time value in the timing information.

19. The system of claim 18, wherein the processor of the selected streaming data center is further configured to retrieve an intra frame whose file offset corresponds to the file offset of the selected index.

20. The system of claim 11, wherein the processor of the data center dispatch server is further configured to: select a streaming data center from the plurality of the streaming data centers to store a plurality of unpopular video streams, each of the unpopular video streams having a number of subscribers below the threshold value.

* * * * *